(12) United States Patent
Okabe

(10) Patent No.: US 7,331,433 B2
(45) Date of Patent: Feb. 19, 2008

(54) BRAKE DISC FOR AUTOMOTIVE DISC BRAKE ASSEMBLY

(75) Inventor: Yasuhisa Okabe, Akashi (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 4 days.

(21) Appl. No.: 10/841,985

(22) Filed: May 7, 2004

(65) Prior Publication Data

US 2005/0092561 A1 May 5, 2005

Related U.S. Application Data

(63) Continuation-in-part of application No. 10/492,373, filed on Apr. 12, 2004, now abandoned.

(51) Int. Cl.
*F16D 65/10* (2006.01)

(52) U.S. Cl. .................... 188/218 XL; 188/26

(58) Field of Classification Search ......... 188/218 XL, 188/17, 264 R, 18 R, 18 A, 26, 264 A, 264 D; D12/180
See application file for complete search history.

(56) References Cited

U.S. PATENT DOCUMENTS

| | | | | |
|---|---|---|---|---|
| 2,850,118 | A | * | 9/1958 | Byers .................... 188/218 XL |
| 3,534,842 | A | * | 10/1970 | Davison, Jr. ............. 188/264 R |
| 5,193,833 | A | * | 3/1993 | Reisinger .................... 280/276 |
| 5,358,086 | A | * | 10/1994 | Muller et al. ......... 188/218 XL |
| 5,454,454 | A | | 10/1995 | Easton et al. |
| D381,609 | S | * | 7/1997 | Ohata et al. ................ D12/180 |
| 6,148,964 | A | * | 11/2000 | Huang ......................... 188/26 |
| 6,164,421 | A | * | 12/2000 | Nakamura et al. ......... 188/71.5 |
| 6,273,223 | B1 | | 8/2001 | Aloy |
| 6,283,257 | B1 | | 9/2001 | Lee |
| 6,386,340 | B1 | | 5/2002 | Milesi et al. |
| 6,467,589 | B2 | * | 10/2002 | Seymour ............... 188/218 XL |
| 6,491,137 | B2 | * | 12/2002 | Lumpkin et al. ......... 188/24.15 |
| 6,957,726 | B2 | * | 10/2005 | Gehrs ................... 188/218 XL |
| 2004/0011608 | A1 | | 1/2004 | Tironi et al. |
| 2005/0056495 | A1 | | 3/2005 | Greppi |

FOREIGN PATENT DOCUMENTS

| | | |
|---|---|---|
| EP | 1 046 831 A2 | 10/2000 |
| JP | 2000-329177 | 11/2000 |
| JP | 2001-165212 | 6/2001 |
| JP | 2001-182764 | 7/2001 |
| JP | D 1151976 | 7/2002 |

\* cited by examiner

*Primary Examiner*—Robert A Siconolfi
*Assistant Examiner*—Mariano Sy

(57) ABSTRACT

There is provided a brake disc in a disc brake for a vehicle, which can be manufactured lightweight, suppress the thermal deformation and is effective to prevent the brake noises. This brake disc (2) is supported by a wheel 4 through a plurality of support members (10) and is operable to exert a braking force when sandwiched by frictional pads (8, 8). The brake disc (2) has an outer peripheral face (2b) formed with a plurality of outer recesses (11) deploying in a circumferential direction. Accordingly, the radial width (f) of the braking surfaces (9), with which the frictional pads (8) is engageable, varies in a direction circumferentially thereof.

19 Claims, 5 Drawing Sheets

PRIOR ART

BRAKE DISC FOR AUTOMOTIVE DISC BRAKE ASSEMBLY

This is a continuation-in-part application of U.S. patent application Ser. No. 10/492,373 filed on Apr. 12, 2004 now abandoned.

BACKGROUND OF THE INVENTION

1. Field of the Invention

The present invention relates to a brake disc in a disc brake used in a vehicle such as a motorcycle.

2. Description of the Related Art

As the conventional brake disc used in motorcycles, a brake disc 50 shown in FIG. 5 has been well known (See the Japanese Design Registration No. 1151976.). The brake disc 50 has a circular outer periphery and also has an inner peripheral portion adapted to be coupled with an outer peripheral portion of a disc hub 52 by a plurality of rivet-like pins 51 arranged in a circumferential direction. When the disc hub 52 is bolted to a hub (not shown) of the wheel, the brake disc 50 is supported by the wheel through the disc hub 52. A braking force is applied to the wheel when opposite braking surfaces of the brake disc 50 are sandwiched by a pair of frictional pads in a caliper fitted to a vehicle frame structure.

In the meantime, the brake disk 50 is required to reduce its outer diameter and plate thickness in view of the demand for reduction in weight. However, if the outer diameter and the plate thickness are reduced, the heat capacity and the amount of heat dissipation decrease, so that during braking the temperature of the brake disc 50 may increase to result in thermal deformation of the brake disc 50. Also, since the radial width of the braking surfaces of the disc 50 is fixed in the circumferential direction, brake squeal or noises tend to occur during braking as a result of resonance taking place between the brake disc 50 and the frictional pads.

In view of the above, there is known a brake disc having an outer peripheral surface formed with a circumferentially extending groove in order to secure the amount of heat dissipation, but the effectiveness of the groove is still insufficient. According to a series of experiments conducted by the inventor of the present invention, it was found that the effectiveness of the groove was something within the range of a measurement error. Also, since the radial width of the braking surfaces of the brake disc is fixed in the circumferential direction, the brake noises cannot be prevented.

In addition, as a brake disc for use in automotive vehicles that is designed to reduce the weight and increase the amount of heat dissipation, the brake disc disclosed in U.S. Pat. No. 6,386,340 is known in which the outer peripheral face and the inner peripheral face are formed in a sinusoidal waveform. However, the radial width of the braking surfaces of the brake disc remains fixed in the circumferential direction and, accordingly, the brake noises cannot be avoided.

SUMMARY OF THE INVENTION

The present invention has been devised in view of the foregoing situations and is intended to provide a brake disc in a disc brake for a vehicle, which can be manufactured lightweight, suppress the thermal deformation and is effective to prevent brake noises.

In order to accomplish the foregoing object, a brake disc for a vehicle according to a first construction of the present invention is a brake disc that is supported by a wheel at an inner peripheral portion thereof through a plurality of support members and is operable to exert a braking force when sandwiched by frictional pads and which includes a plurality of outer recesses defined in an outer peripheral face so as to deploy in a circumferential direction, and braking surfaces engageable with the frictional pads and having a radial width that varies in a direction circumferentially thereof.

With the brake disc of the structure described above, not only can the weight be reduced in a quantity corresponding to the outer recesses, but also an outer peripheral portion of the brake disc, which has a greater thermal deformation than the inner peripheral portion because of the diameter greater than that of the inner peripheral portion, can expand along the outer recesses in the circumferential direction and, therefore, the thermal expansion of the outer peripheral portion can be sufficiently allowed not only in the circumferential direction, but also in the radial direction. In other words, the thermal deformation of the outer peripheral portion can easily be accommodated and an undesirable deformation of the brake disc in a direction across the thickness thereof (i.e., the axial direction) can be suppressed. Also, since the radial width of the braking surfaces changes in the circumferential direction of the brake disc, the surface area of each of the braking surfaces in contact with the frictional pads varies as the brake disc rotates and, therefore, resonance which would occur between the brake disc and the frictional pads can advantageously be prevented to thereby minimize the phenomenon of brake noises resulting from the resonance during braking.

The number of the outer recesses is preferably equal to or greater than that of the support members. According to this structural feature, because the number of the outer recesses in a number equal to or greater than that of locations at which the brake disc are fastened by the support members, the thermal deformation of the outer peripheral portion can easily be accommodated in the outer recesses.

In one preferred embodiment of the present invention, each of the outer recesses has a bottom having an arcuate shape. Accordingly, since the bottom of each of the outer recesses forms a convex surface or a surface smoothly curved to bulge in a direction radially outwardly, dirt and grits would hardly be accumulated in the outer recesses.

Preferably, each of the outer recesses has a depth that is set to a value within the range of 0.15 to 0.25 times a maximum width of the braking surface delimited between outermost and innermost peripheral edges of the braking surface. If the depth of each outer recess is smaller than the value 0.15 times the maximum width of the braking surface, the degree of change of the radial width of the braking surface in the circumferential direction becomes too small and, therefore, respective effects of the present invention to reduce the weight, suppress the thermal deformation and prevent the brake noises would be minimal. On the other hand, if the depth of each outer recess is more than the value 0.25 times the maximum width of the braking surface, the radial width of the braking surface becomes too small at an area where the outer recesses exist and, therefore, the braking force will decrease.

The brake disc may have an inner peripheral face formed with a plurality of inner recesses. According to this structural feature, additional formation of the inner recesses makes it possible to further reduce the weight of the brake disc and also to further facilitate change of the radial width of the braking surface, preventing the phenomenon of the brake noises which would occur during braking.

Each of the inner recesses may be formed in the inner peripheral face of the braking surface at a location between the neighboring support members.

Also, the inner recesses may be formed at respective locations of the inner peripheral face that confront with some of the plural outer recesses in a direction radially inwardly thereof. According to this feature, change of the radial width of the braking surface can be increased at such locations of the brake disc where the inner recesses exist.

Each of the inner recesses has a bottom which may be of, for example, an arcuate shape.

Preferably, each of the inner recesses has a depth that is set to a value within the range of 0.15 to 0.25 times a maximum width of the braking surface delimited between outermost and innermost peripheral edges of the braking surface.

The innermost peripheral edge of the braking surface may represent a circle, with no inner recesses defined therein. When this innermost peripheral edge defines the inner peripheral face of the brake disc, the inner peripheral face is eventually formed by a cylindrical face.

DETAILED DESCRIPTION OF THE EMBODIMENTS

Figure 1:
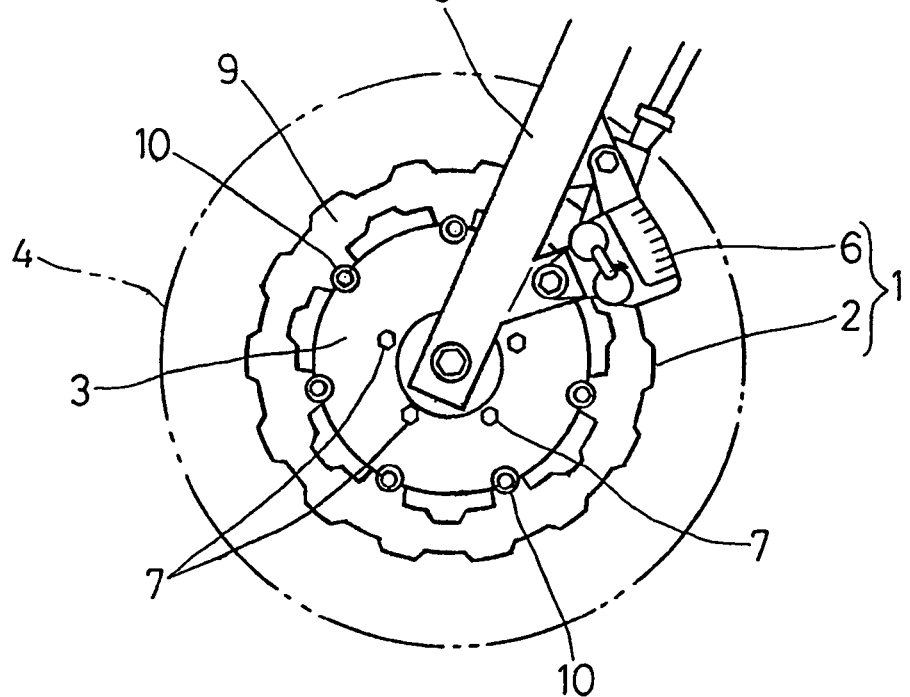
FIG. 1 is a side view showing a motorcycle front wheel provided with a brake disc for an automotive disc brake assembly according to a first preferred embodiment of the present invention.
Figure 2:
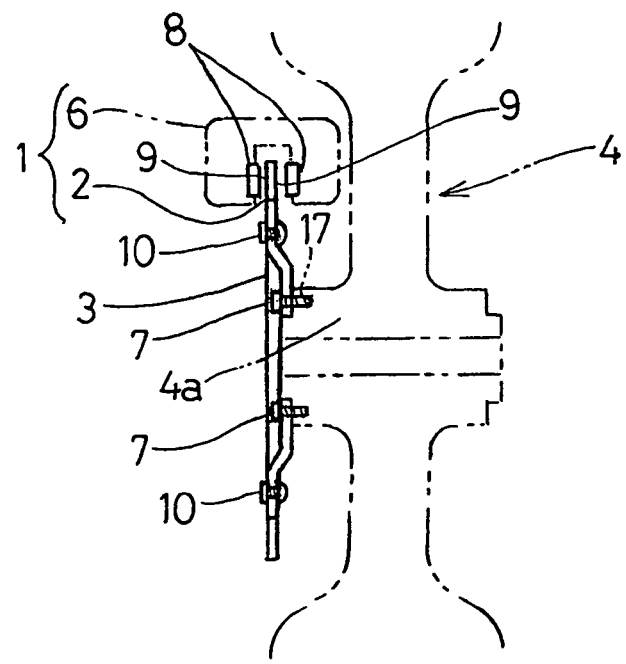
FIG. 2 is a transverse sectional view of the brake disc showing the manner in which the brake disc is fitted to the motorcycle front wheel.

Hereinafter, preferred embodiments of the present invention will be described with reference to the accompanying drawings. Referring first to FIG. 1 illustrating, in a side view, a motorcycle front wheel provided with a brake disc for a vehicle according to a first preferred embodiment of the present invention, the brake disc identified by 2 forms a part of and is operatively associated with a disc brake assembly 1 that is mounted on a motorcycle. This brake disc 2 is fixedly mounted on a wheel 4 for rotation together therewith and has braking surfaces 9 and 9 opposite to each other. The disc brake assembly 1 also includes a caliper 6 mounted on a motorcycle body structure, for example, a front fork 5. As shown in FIG. 2, the brake disc 2 is fixedly mounted on the wheel 4 through a disc hub 3 rigidly secured to a wheel hub 4a of the wheel 4 by a plurality of bolts 7. The caliper 6 includes left and right frictional pads 8 and 8 that can be driven through caliper pistons (not shown) by a hydraulic pressure, generated in a master cylinder (not shown), so as to move close towards and away from each other. As will be described later, the caliper 6 includes two pairs of frictional pads 8 and 8. The left and right frictional pads 8 and 8 sandwich the braking surfaces 9 and 9 of the brake disc 2 to apply a braking force to the wheel 4.

Figure 3A:
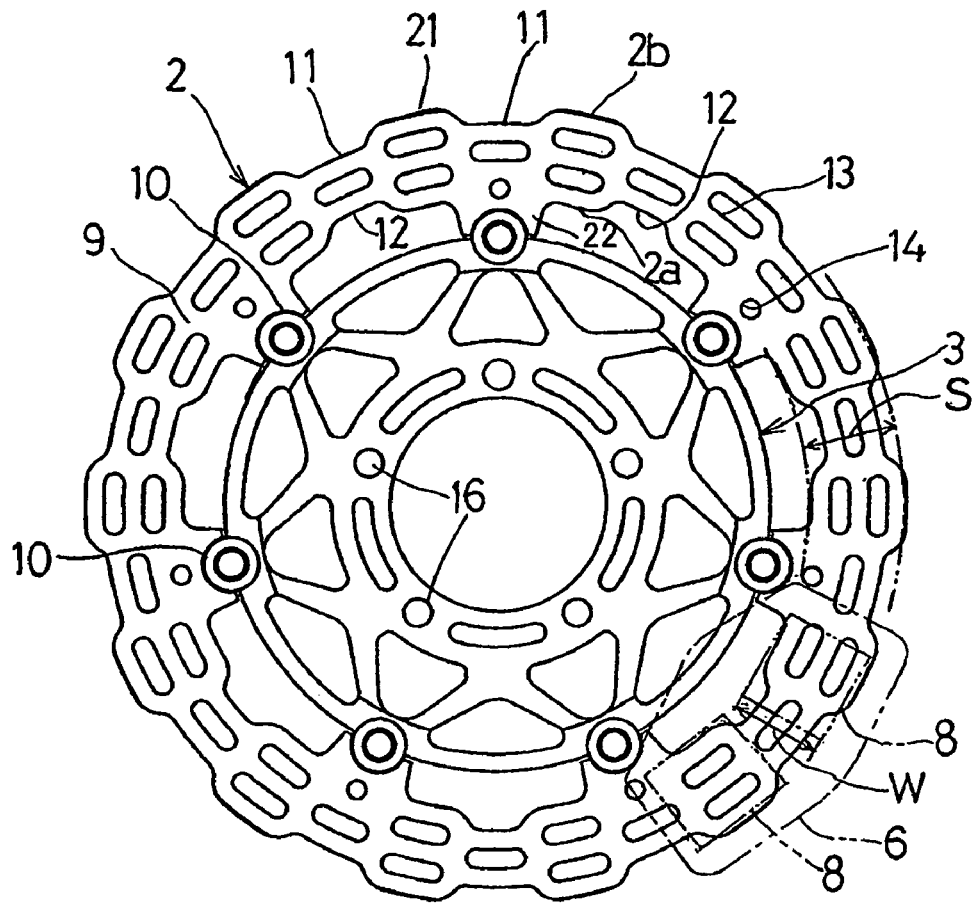
FIG. 3A is a side view of the brake disc shown as coupled with a disc hub.

FIG. 3A illustrates a side view of the brake disc 2 coupled with the disc hub 3. The brake disc 2 has inner and outer peripheral faces 2a and 2b opposite to each other and also has a plurality of, for example, seven, support limbs 22 protruding radially inwardly from the inner peripheral face 2a and spaced an equal distance from each other in a circumferential direction. This brake disc 2 is connected with the disc hub 3 in coaxial relation through the support limbs 22 by the use of a corresponding number of support members 10 that are positioned spaced an equal distance from each other in the circumferential direction of the disc hub 3. The disc hub 3 has an inner peripheral portion formed with a circular row of bolt insertion holes 16 spaced equally in the circumferential direction and is mounted on the wheel 4 by threading bolts 7, which have been inserted in the bolt insertion holes 16, into screw holes 17 that are formed in the wheel hub 4a as shown in FIG. 2. The support members 10 shown in FIG. 3A may be a rivet-like pin and connection of the disc hub 3 with the brake disc 2 can be accomplished by upsetting those support members 10. Thus, it will readily be seen that the brake disc 2 is supported by the wheel 4 (FIG. 2) through the disc hub 3 by way of the support members 10.

Figure 3B:
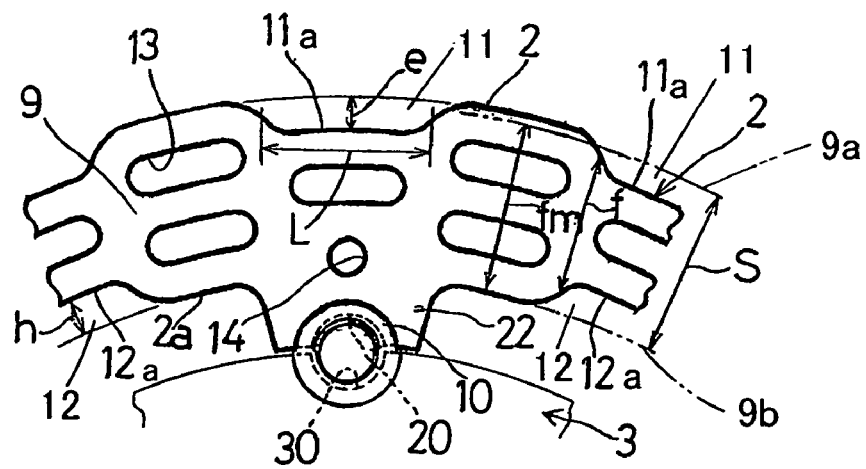
FIG. 3B is a fragmentary side view, on enlarged scale, showing the brake disc shown in FIG. 3B.

More specifically, as shown in FIG. 3B, each of the support members 10 is loosely accommodated within semi-circular mounting grooves 20 and 30 defined respectively in the brake disc 2 and the disc hub 3, with a slight gap formed between the support member 10 and the corresponding mounting grooves 20, 30, so that vibrations of the brake disc 2 during braking can be prevented from being directly transmitted to the wheel 4 (FIG. 2). It is to be noted that each support member 10 may be a bolt.

Referring again to FIG. 3A, the outer peripheral face 2b of the brake disc 2 is formed with a plurality of circumferentially equidistantly spaced outer recesses 11, leaving protrusions 21 between the neighboring outer recesses 11. Thus, the outer peripheral face 2b of the brake disc 2 has the outer recesses 11 and the protrusions 21 that alternate with each other in a direction circumferentially thereof. The fourteen outer recesses 11 are employed herein. On the other hand, the inner peripheral face 2a of the brake disc 2 is formed with a plurality of circumferentially equidistantly spaced inner recesses 12 defined therein so as to extend radially inwardly of the brake disc 2 and positioned generally in alignment with the outer recesses 11. In the illustrated embodiment, each support limb 22 or each support member 10 is employed and arranged every other outer recess 11 in the outer periphery of the brake disc 2 while each inner recess 12 in the inner periphery of the brake disc 2 is employed and arranged every other outer recess 11 and generally in alignment with one of the outer recesses 11 which is out of alignment with the corresponding support limb 22 or the corresponding support member 10, i.e., between the neighboring support limbs 22 or the support members 10. Accordingly, it will readily be seen that the opposite braking surfaces 9 and 9 engageable with the frictional pads 8 and 8 has a width as measured in a direction radially thereof, which varies discretely in a direction circumferentially of the brake disc 2. It is also to be noted that although the two pairs of circumferentially spaced frictional pads 8 and 8 have been described as employed in the illustrated embodiment, only one pair of the frictional pads 8 and 8 may be employed.

To reduce the weight of the brake disc 2 to a value as small as possible, the brake disc 2 has a multiplicity of perforations 13 and 14 defined therein so as to extend completely across the thickness of the brake disc 2. As shown by the double-dotted phantom line in FIG. 3A, the frictional pads 8 and 8 have a width as measured in a direction radially with respect to the brake disc 2 and are engageable with the corresponding braking surface 9 of the brake disc 2 over the entire width thereof. Accordingly, as shown in FIG. 3B, each of the braking surfaces 9 of the brake disc 2 is represented by a surface region bound within an annular area S of a radial width W delimited between an innermost peripheral edge 9b and an outermost peripheral edges 9a of the respective braking surface 9 shown by the double-dotted lines extending in areas where no outer recesses 11 is formed.

Also, each outer recess 11 has a depth e defined between the bottom 11a thereof and the imaginary line extending in touch with respective radially outermost edges of the neighboring radially outward protrusions 21 as shown in FIG. 3B, which depth e is preferably chosen to be within the range of 0.15 to 0.25 times and, more preferably, within the range of 0.17 to 0.23 times the maximum radial width f of each braking surface 9, that is, the radial distance fm between the outermost peripheral edge 9a and the innermost peripheral edge 9b. It is to be noted that in the illustrated embodiment the radial distance fm referred to above is shown to be equal to the maximum radial width W and, in such case, the depth e of each outer recess 11 is chosen to be 0.20 times the radial distance fm.

Each outer recess 11 also has an effective circumferential length L as measured between the neighboring radially outward protrusions 21 on respective sides of such outer recess 11 and along the imaginary circle depicted so as to pass through points each intermediate between the hill, represented by the radially outermost edge of the respective radially outward protrusion 21, and the dale represented by the bottom 11a of the respective outer recess 11. This effective circumferential length L of each of the outer recesses 11 is of a value preferably within the range of 0.30 to 1.40 times and, more preferably, within the range of 0.60 to 1.30 times the maximum radial width fin between the outermost peripheral edge 9a and the innermost peripheral edge 9b. In the illustrated embodiment, however, the effective circumferential length L is chosen to be 1.0 times the maximum radial width fm, i.e., of a value equal to the maximum radial width fin. Thus, the bottom 11a of each outer recess 11 is of an arcuate shape occupying a portion of the circle concentric with the axis of rotation of the brake disc 2 and is positioned radially inwardly from the outermost peripheral edge 9a.

Similarly, each inner recess 12 has a depth h defined between the bottom 12a thereof and the innermost peripheral edge 9b, which depth h is chosen to be preferably within the range of 0.15 to 0.25 times and, more preferably, within the range of 0.17 to 0.23 times the maximum radial width fm of each braking surface 9 as is the case with the depth e of each outer recesses 11. In the illustrated embodiment, however, the depth h of each of the inner recesses 12 is chosen to be 0.20 times the maximum radial width fm. It is accordingly clear that the bottom 12a of each of the inner recesses 12 is positioned radially outwardly from the innermost peripheral edge 9b.

The outer protrusions 21 are spaced circular face arc portions, each with a respective length concentric with an axis of rotation of the brake disc 2. The outer recesses 11 of the outer peripheral face 2b also are spaced circular bottom arc portions each with a respective length concentric with the axis of rotation of the brake disc 2. Each of the outer recess openings, as shown in FIGS. 3A and 3B have sloping surfaces extending radially outward from the bottom circular arc portion to an adjacent outer peripheral face circular arc portion. As can be observed in FIGS. 3A and 3B, the respective circumferential lengths of the outer peripheral face 2b and the respective circumferential lengths of the inner peripheral face 2a are each longer in length than the circumferential length of the respective sloping surfaces interconnecting the respective recesses and protrusions thereof.

In the brake disc 2 so constructed as hereinabove described, since the outer peripheral face 2b of the brake disc 2 of FIG. 3A is formed with the plural outer recesses 11 deployed in a direction circumferentially thereof, the weight of the brake disc 2 can advantageously be reduced. Also, the formation of the plural outer recesses 11 in the brake disc 2 permits the outer peripheral portion, which has a greater thermal deformation than the inner peripheral portion because of the diameter greater than that of the inner peripheral portion, to expand along the outer recesses 11 in the circumferential direction and, therefore, thermal expansion of the outer peripheral portion can be sufficiently allowed not only in the circumferential direction, but also in the radial direction. In other words, thermal deformation of the outer peripheral portion can easily be accommodated. As a result thereof, an undesirable deformation of the brake disc 2 in a direction across the thickness thereof can advantageously be suppressed. Also, since the presence of the outer recesses 11 allows the radial width f of the braking surfaces 9, with which the frictional pads 8 are engageable, to vary in the circumferential direction of the brake disc 2, the surface area of each of the braking surfaces 9, with which the frictional pads 8 are engageable, varies as the brake disc 2 rotates and, therefore, resonance which would occur between the brake disc 2 and the frictional pads 8 if such surface area does not vary can advantageously be prevented to thereby minimize the phenomenon of brake noises resulting from the resonance during braking.

In addition, since respective portions of the inner peripheral face 2a of the brake disc 2 which confront the outer recesses 11 in the radial direction thereof are formed with the inner recesses 12, the weight of the brake disc 2 can advantageously be further reduced. Also, the formation of the plural inner recesses 12 in the brake disc 2 permits the radial width f of the braking surfaces 9, with which the frictional pads 8 are engageable respectively, to vary considerably in the circumferential direction of the brake disc 2, resulting in increase of the effect of preventing the resonance between the brake disc 2 and the frictional pads 8 during braking and, therefore, the phenomenon of brake noises resulting from the resonance during braking can advantageously be minimized.

Considering that the number of the outer recesses 11 is chosen to be equal to or greater than that of the support members 10 (although in the illustrated embodiment the outer recesses 11 are employed in a number twice that of the support member 10), the number of the outer recesses 11 which serve to accommodate thermal deformation comes to be equal to or greater than that of the support limbs 22 that are fastened by the respective support members 10 and, therefore, the thermal deformation can easily be accommodated.

Figure 4A:
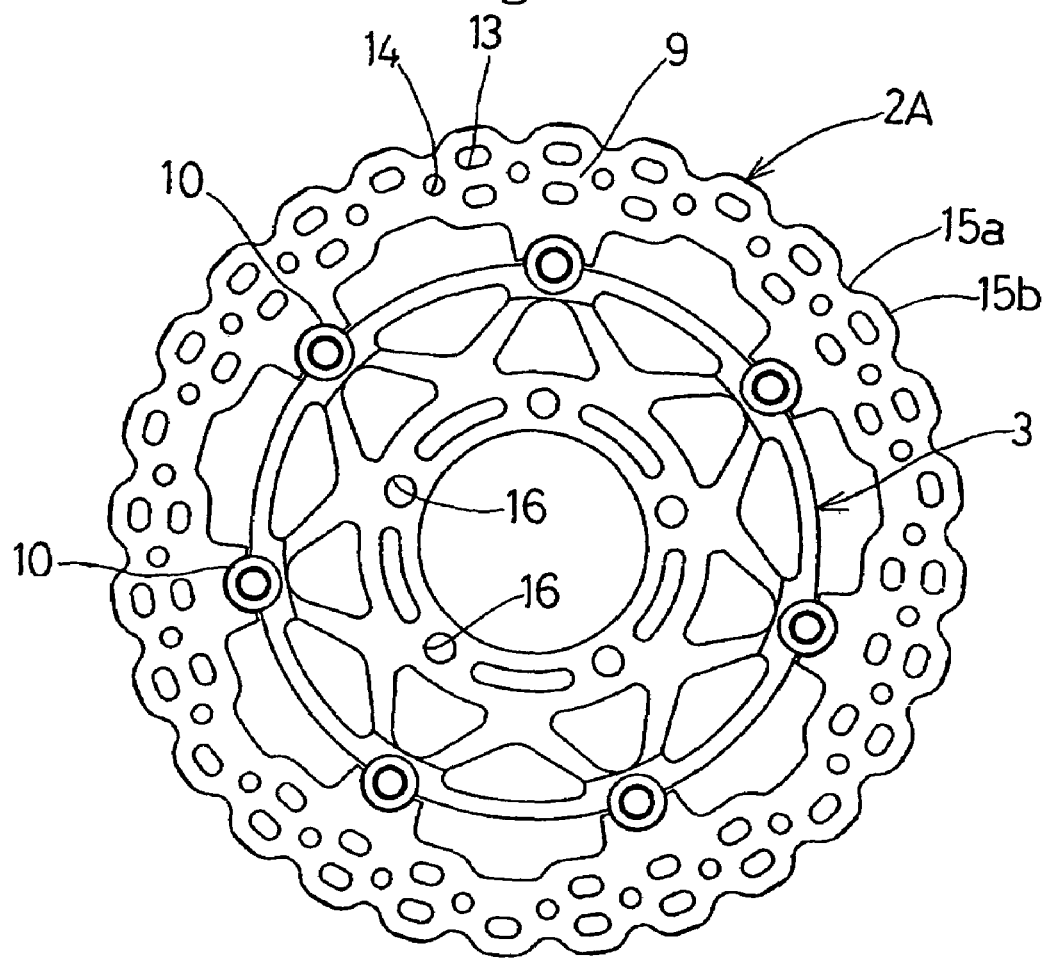
FIG. 4A is a side view of the brake disc shown as coupled with the disc hub according to a second preferred embodiment of the present invention.

FIG. 4A illustrates a side view of the brake disc according to a second preferred embodiment of the present invention, which disc is shown as coupled with the disc hub. The brake disc now identified by 2A is similar to the brake disc 2 shown in and described with particular reference to FIGS. 3A and 3B, except that the outer peripheral face 2b (FIG.

4B) of the brake disc 2A is so corrugated as to leave circumferentially alternating recesses and protrusions 15a and 15b that are arranged spaced an equidistant from each other in the circumferential direction thereof. On the other hand, the inner peripheral face 2a of the brake disc 2A is formed with the inner recesses 12 each positioned between the neighboring support members 10 and 10 in a manner similar to those described in connection with the previously described embodiment and, thus, it is clear that the radial width f of the braking surfaces 9, with which the frictional pads 8 are engageable, varies discretely in the circumferential direction of the brake disc 2A.

Figure 4B:
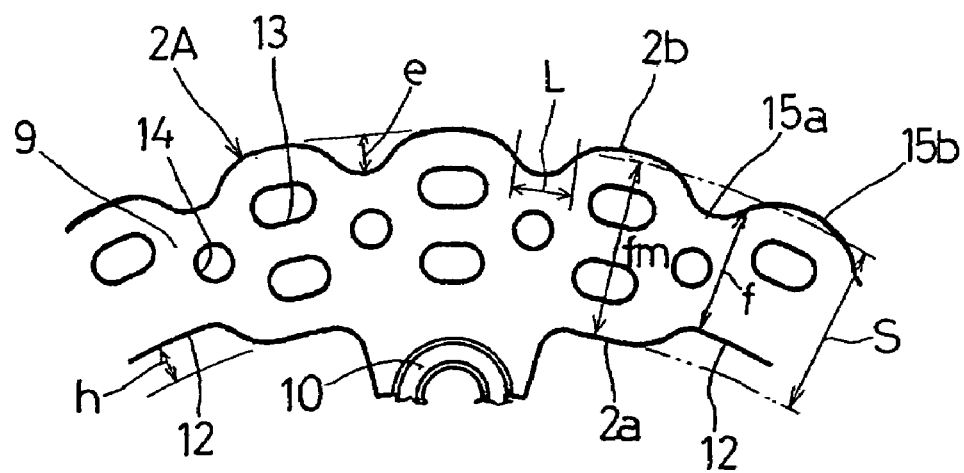
FIG. 4B is a fragmentary side view, on enlarged scale, showing the brake disc shown in FIG. 4A.

Even in the embodiment now under discussion, as shown in FIG. 4B showing a portion of the brake disc 2A on an enlarged scale, each of the outer recesses 15a has the depth e which is chosen to be of a value preferably within the range of 0.15 to 0.25 times the maximum radial width fm of the braking surfaces 9, although in the illustrated embodiment the depth e is chosen to be of a value 0.20 times the maximum radial width fm. Similarly, each of the outer recesses 15a has the effective circumferential length L that is chosen to be of a value 0.33 times the maximum radial width fm of the braking surface 9. Unlike the outer recesses 11 of which bottoms 11a represent the arcuate shape occupying a portion of the circle concentric with the axis of rotation of the brake disc 2 in the previously described embodiment, the outer recesses 15a shown in FIGS. 4A and 4B have their bottoms representing not the arcuate shape, but a generally sinusoidal waveform. Also, in the embodiment of FIGS. 4A and 4B, the inner recesses 12 has the depth h which is chosen to be of a value preferably within the range of 0.15 to 0.25 times the maximum radial width fm of the braking surfaces 9, although so far shown therein the depth h is chosen to be 0.20 times the maximum radial width fm.

As described above, in the brake disc 2A so constructed, since the outer peripheral face 2b of the brake disc 2 is formed with the circumferentially alternating outer recesses and protrusions 15a and 15b deployed in a direction circumferentially thereof, the weight of the brake disc 2A can advantageously be reduced. Also, the formation of the circumferentially alternating outer recesses and protrusions 15a and 15b in the brake disc 2 permits the outer peripheral portion, which has a greater thermal deformation than the inner peripheral portion because of the diameter greater than that of the inner peripheral portion, to expand along the outer recesses in the circumferential direction and, therefore, thermal expansion of the outer peripheral portion can be sufficiently tolerated not only in the circumferential direction, but also in the radial direction. As a result thereof, an undesirable deformation of the brake disc 2A in a direction across the thickness thereof (i.e., the axial direction) can advantageously be suppressed. Also, since the presence of the outer recesses and protrusions 15a and 15b allows the radial width f of the braking surfaces 9, with which the frictional pads 8 are engageable, to vary in the circumferential direction of the brake disc 2A, the surface area of each of the braking surfaces 9, with which the frictional pads 8 are engageable, varies as the brake disc 2A rotates and, therefore, resonance which would occur between the brake disc 2A and the frictional pads 8 can advantageously be prevented to thereby minimize the phenomenon of brake noises resulting from the resonance during braking. It is to be noted that in the second embodiment of the present invention shown in and described with reference to FIGS. 4A and 4B, the width of each of the protrusions 15b as measured in a direction circumferentially of the brake disc 2A is smaller than that of each protrusion 21 shown in FIGS. 3A and 3B and, therefore, the amount of thermal deformation of each protrusion 15b is correspondingly smaller than that occurring in the protrusion 21. Accordingly, even though the circumferential width of each of the recesses 15a is small, thermal deformation of the protrusions 15b both in the radial direction and in the circumferential direction can be tolerated.

In addition, since respective portions of the inner peripheral face 2a of the brake disc 2A which are each encompassed between the neighboring support members 10 and 10 are formed with the inner recesses 12, not only can the weight of the brake disc 2A be further reduced advantageously, but also the phenomenon of brake noises resulting from the resonance between the brake disc 2A and the frictional pads 8 during braking can also be further minimized.

Yet, since the number of the outer recesses 15a is chosen to be equal to or greater than that of the support members 10, it is effective to facilitate accommodation of the thermal deformation of the outer recesses 15a in a manner similar to that described in connection with the previously described embodiment.

Figure 5:
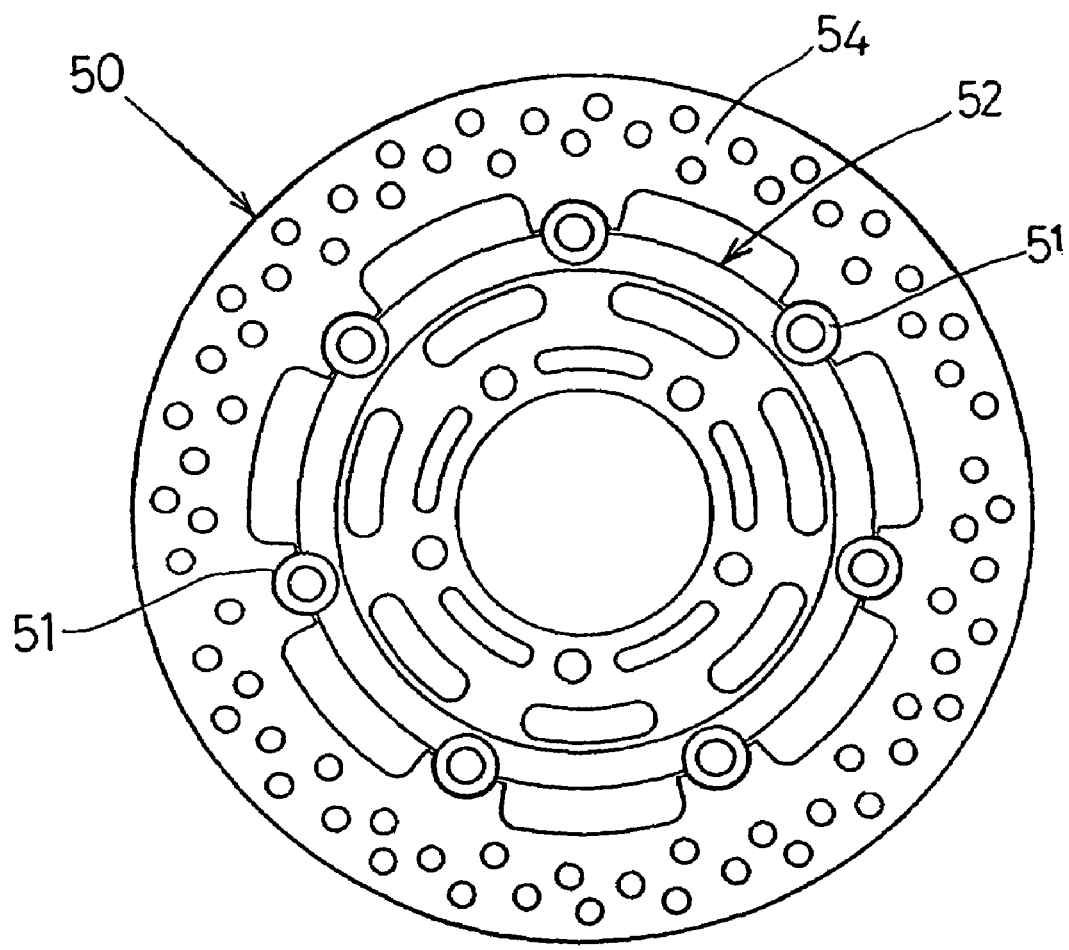
FIG. 5 is a side view of the conventional brake disc.

A series of experiments were conducted to determine the amount of thermal deformation occurring in the brake disc 2 and 2A and the conventional brake disc 50 shown in FIG. 5. Results of those experiments are shown in Table 1 below. The amount of thermal deformation of the brake discs 2, 2A and 50 in thickness (i.e., the axial thickness) was determined in terms of millimeter by heating to 500° C. one of the opposite braking surfaces of each of the brake discs 2, 2A and 50 while the other of the opposite braking surfaces was left at room temperature.

TABLE 1

| Type of Disc | First Embodiment | Second Embodiment | Conventional |
|---|---|---|---|
| Amt. of Thermal Deformation (mm) | 1.06 | 1.18 | 1.21 |

From the results of measurement shown in Table 1, it is clear that the amount of thermal deformation (1.18 mm) in the brake disc 2A according to the second embodiment of the present invention shown in and described with reference to FIGS. 4A and 4B is smaller than the amount of thermal deformation (1.21 mm) in the conventional brake disc 50 shown in FIG. 5 and that the amount of thermal deformation (1.06 mm) in the brake disc 2 according to the first embodiment of the present invention shown in and described with reference to FIGS. 3A and 3B is much smaller than that in the conventional brake disc 50 shown in FIG. 5.

Figure 6:
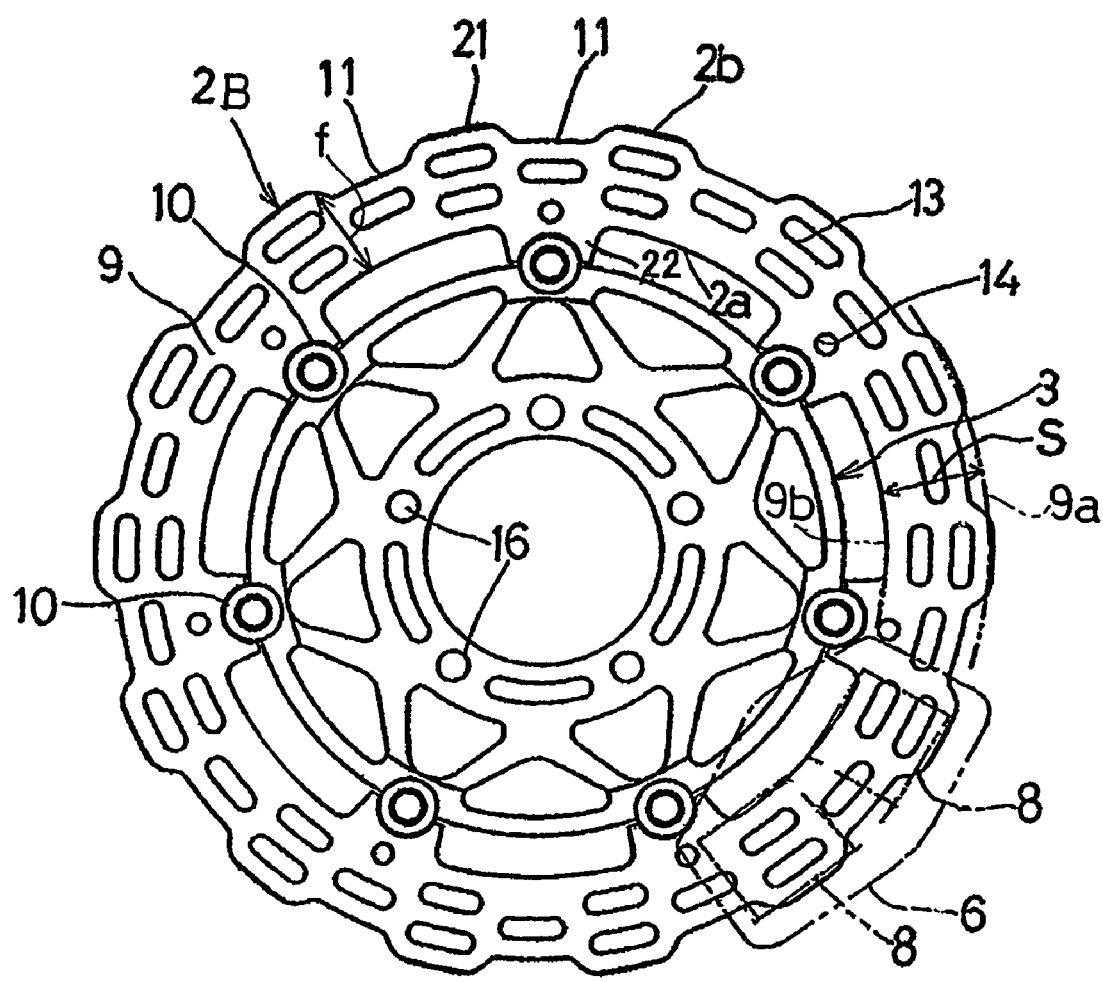
FIG. 6 is a side view of the brake disc coupled with a disc hub according to a third preferred embodiment of the present invention.

FIG. 6 shows a disc brake 2B in accordance with a third preferred embodiment of the present invention. The third embodiment differs from the first and second embodiments in that the inner peripheral face 2a of the brake disc 2B is defined as a cylindrical surface, with no inner recesses defined therein. Accordingly, the innermost peripheral edge 9b of the braking surface 9 that defines the inner peripheral face 2a is in the form of a circle concentric with the brake disc 2B. On the other hand, the outer peripheral face 2b of the brake disc 2B is formed with the outer recesses 11 which are the same as those of the brake disk 2 of the first embodiment shown in FIG. 3A.

According to the third embodiment, as is the case with the first embodiment, the formation of the outer recesses 11 allows the disc brake 2B to reduce its weight. In addition, such formation accommodates the thermal deformation of the outer peripheral portion of the brake disc 2B. As a result, an undesirable deformation of the brake disc 2 in a direction across the thickness thereof can advantageously be suppressed. Also, since the outer recesses 11 allows the radial width f of the braking surfaces 9 to vary in the circumferential direction of the brake disc 2, the surface area of each of the braking surfaces 9, with which the frictional pads 8 are engageable, varies as the brake disc 2 rotates and, therefore, resonance which would occur between the brake disc 2 and the frictional pads 8 if such surface area does not vary can advantageously be prevented to thereby minimize the phenomenon of brake noises resulting from the resonance during braking.

What is claimed is:

1. A brake disc for a vehicle, which disc is supported by a wheel at an inner peripheral portion thereof through a plurality of support members and is operable to exert a braking force when sandwiched by frictional pads, said brake disc comprising:
    inner and outer peripheral faces, the outer peripheral face having a plurality of spaced circular face arc portions with a respective length concentric with an axis of rotation of the brake disc;
    a plurality of outer recesses are defined in the outer peripheral face so as to deploy in a circumferential direction; and
    a braking surface engageable with the frictional pad and having a radial width that varies in a direction circumferentially thereof, wherein each of the outer recesses has a bottom having circular bottom arc portions with a respective length concentric with the axis of rotation of the brake disc, and each of the outer recesses opening have sloping surfaces extending radially outwardly along a circumferential length increasing progressively in a direction radially outwardly from the bottom circular arc portion to an adjacent outer peripheral face circular arc portion, wherein the number of the outer recesses is equal to or greater than that of the support members.

2. The brake disc for a vehicle as claimed in claim 1, wherein each of the outer recesses has a depth that is set to a value within the range of 0.15 to 0.25 times a maximum width of the braking surface delimited between outermost and innermost peripheral edges of the braking surface.

3. The brake disc for a vehicle as claimed in claim 1, further comprising a plurality of inner recesses defined in the inner peripheral face so as to deploy in a circumferential direction and to recede radially outwardly of an innermost peripheral edge of the braking surface.

4. The brake disc for a vehicle as claimed in claim 3, wherein each of the inner recesses is formed in the braking surface at a location between the neighboring support members.

5. The brake disc for a vehicle as claimed in claim 3, wherein the inner recesses are formed at respective locations of the inner peripheral face that confront with some of the outer recesses in a direction radially inwardly thereof.

6. The brake disc for a vehicle as claimed in claim 3, wherein each of the inner recesses has a bottom having a circular shape concentric with the axis of rotation.

7. The brake disk for a vehicle as claimed in claim 3, wherein the inner peripheral face has a circular shape concentric with the axis of rotation and each of the inner recesses has a depth from the inner peripheral face, that is set to a value within the range of 0.15 to 0.25 times a maximum width of the braking surface delimited between outermost and innermost peripheral edges of the braking surface.

8. The brake disc for a vehicle claimed in claim 1, wherein the braking surface has an inner peripheral edge representing a circle.

9. The brake disc for a vehicle claimed in claim 8, wherein the inner peripheral face that defines the inner peripheral edge is a cylindrical surface.

10. The brake disc of claim 1 wherein the braking surface has a plurality of perforations.

11. The brake disc of claim 10 wherein sets of two perforations are aligned radially relative to an axis of rotation about which the brake disc is designed to rotate.

12. The brake disc of claim 10 wherein oblong perforations are provided.

13. The brake disc of claim 10 wherein oblong and circular perforations are provided.

14. The brake disc of claim 10 wherein sets of oblong perforations are aligned radially relative to an axis of rotation about which the brake disc is designed to rotate.

15. The brake disc of claim 14 wherein individual oblong perforations are positioned between adjacent sets of oblong perforations.

16. The brake disc for a vehicle as claimed in claim 1, wherein an effective circumferential length of each of the outer recesses is within the range of 0.30-1.40 times a maximum radial width between outermost and innermost peripheral edge of the braking surface.

17. The brake disc for a vehicle as claimed in claim 1, wherein an effective circumferential length f each of the outer recesses is shorter than each of protrusions on respective sides of such outer recess.

18. The brake disc for a vehicle as claimed in claim 17, wherein each of the outer recesses has a depth that is set to a value within the range of 0.15 to 0.25 times a maximum radial width of the braking surface delimited between outermost and innermost peripheral edges of the braking surface.

19. A brake disc for a vehicle, which disc is supported by a wheel at an inner peripheral portion thereof through a plurality of support members and is operable to exert a braking force when sandwiched by frictional pads, said brake disc comprising:
    inner and outer peripheral faces, the outer peripheral face having a plurality of spaced circular face arc portions with respective lengths concentric with an axis of rotation of the brake disc;
    a plurality of outer recesses are defined in the outer peripheral face so as to deploy in a circumferential direction; and
    a braking surface engageable with the frictional pad and having a radial width that varies in a direction circumferentially thereof, wherein each of the outer recesses has a bottom having circular bottom arc portions with a respective length concentric with the axis of rotation of the brake disc, and each of the outer recesses opening have sloping surfaces extending radially outwardly along a circumferential length increasing progressively in a direction radially outwardly from the bottom circular arc portion to an adjacent outer peripheral face circular arc portion, wherein the number of the outer recesses is equal to or greater than that of the support members and the circumferential length of the respective outer peripheral face and the circumferential length of the respective inner peripheral face are each longer in length than the circumferential length of the sloping surfaces.

* * * * *